(12) United States Patent
Kobayashi et al.

(10) Patent No.: US 9,523,450 B2
(45) Date of Patent: Dec. 20, 2016

(54) FLANGE JOINT CONNECTION STRUCTURE

(71) Applicant: Masato Kobayashi, Hiroshima (JP)

(72) Inventors: Kazumi Kobayashi, Fukuyama (JP);
Masato Kobayashi, Fukuyama (JP)

(*) Notice: Subject to any disclaimer, the term of this patent is extended or adjusted under 35 U.S.C. 154(b) by 58 days.

(21) Appl. No.: 14/374,140

(22) PCT Filed: Oct. 10, 2012

(86) PCT No.: PCT/JP2012/076155
§ 371 (c)(1),
(2) Date: Jul. 23, 2014

(87) PCT Pub. No.: WO2013/118346
PCT Pub. Date: Aug. 15, 2013

(65) Prior Publication Data
US 2014/0367964 A1 Dec. 18, 2014

(30) Foreign Application Priority Data
Feb. 7, 2012 (JP) ................................. 2012-023582

(51) Int. Cl.
*F16L 23/024* (2006.01)
*F16L 23/18* (2006.01)

(52) U.S. Cl.
CPC .............. *F16L 23/024* (2013.01); *F16L 23/18* (2013.01)

(58) Field of Classification Search
CPC .......... F16L 23/18; F16L 23/024; F16B 21/10; F16B 21/20
USPC ............................ 285/414, 415, 416, 90, 404
See application file for complete search history.

(56) References Cited

U.S. PATENT DOCUMENTS

| | | | | |
|---|---|---|---|---|
| 223,835 A | * | 1/1880 | Boyle | 285/336 |
| 544,147 A | * | 8/1895 | Webb | 285/189 |
| 1,377,418 A | * | 5/1921 | Krogh | E21B 17/046 279/83 |
| 2,111,243 A | * | 3/1938 | Hecht | 285/404 |

(Continued)

FOREIGN PATENT DOCUMENTS

| | | |
|---|---|---|
| JP | 51-9667 | 3/1976 |
| JP | 63-20946 | 2/1988 |

(Continued)

OTHER PUBLICATIONS

International search report for PCT/JP2012/076155 Received at International Bureau: Nov. 8, 2012 (Nov. 8, 2012) [JP].

(Continued)

*Primary Examiner* — Michael P Ferguson
*Assistant Examiner* — Jay R Ripley
(74) *Attorney, Agent, or Firm* — Merek Blackmon & Voorhees LLC (57) ABSTRACT

In order to connect pressure piping while ensuring fluid-tightness without requiring welding at the installation site, the outer circumferential surface (4) of a flange joint (1) connects the face (2), on the side on which a pressure pipe (40) aligned on the center line (C) is inserted into a center hole (10), and the face (3), on the side another component is between the insertion-side face (2) and the other-component-connection face (3). The inner walls of vertical holes (6) are provided with a screw thread (6*b*), and between the face (2) and the face (3) these vertical holes run from the outer circumferential surface (4) to the inner circumferential surface (5) of the center hole (10) so as to intersect the horizontal holes (7).

3 Claims, 9 Drawing Sheets

(56) References Cited

U.S. PATENT DOCUMENTS

| | | | | |
|---|---|---|---|---|
| 2,472,307 A | * | 6/1949 | Nagel | 359/611 |
| 3,018,120 A | * | 1/1962 | Vann | 285/55 |
| 3,418,009 A | * | 12/1968 | Pollia | 285/39 |
| 5,330,236 A | * | 7/1994 | Peterjohn | F16L 33/32 |
| | | | | 138/109 |
| 2013/0285374 A1 | | 10/2013 | Kobayashi | |

FOREIGN PATENT DOCUMENTS

| | | |
|---|---|---|
| JP | 10-281372 | 10/1998 |
| JP | 10-311469 | 11/1998 |
| JP | 10-325491 | 12/1998 |
| JP | 2000-088160 | 3/2000 |
| JP | 2003-180011 | 6/2003 |
| JP | 3152172 | 7/2009 |
| JP | 2010-180957 | 8/2010 |
| JP | 2011-127672 | 6/2011 |

OTHER PUBLICATIONS

International Report on Patentability (IPRP) Chapter II of the PCT for PCT/JP2012/076155 Chapter II demand received: Dec. 3, 2012 (Dec. 3, 2012).

\* cited by examiner

FLANGE JOINT CONNECTION STRUCTURE

TECHNICAL FIELD

The present invention relates to a connecting structure of flange joint capable of connecting pressure piping without requiring welding at an installation site.

BACKGROUND ART

There is known a flange type pipe joint used to connect pressure piping. The flange type pipe joint includes a welding type flange and a loose flange, etc. For example, Patent Document 1 discloses the welding type flange, wherein a flange is welded on an end portion of each of two pipes, a sealing member is interposed between the flanges of the pipes, and then each of the flanges is tightened by bolts. This flange is so called a plate flange, being an example of plug welding wherein the top face and the inside of the inside diameter of the flange are respectively welded. Further, Patent Document 1 indicates a loose flange type pipe joint wherein a loose flange is fitted on the pipe, and then, an end portion of the pipe is flange-machined on the pipe end portion, and the pipes are butted through a sheet packing on both surfaces of the flanges, and the flanges are tightened with the bolts. The loose flange is used to connect low pressure pipes. A butt welding-type flange, a socket welding-type flange, a screwed-type flange, etc. are known other than a flange disclosed in Patent Document 1. In the screwed-type flange, welding is not needed.

Patent Document 5 discloses an example wherein the flange is fixed on the pipe with screws. In this example, the pipe is inserted into the central part of the flange, the screws are screwed from the side of the flange toward the pipe, and the pipe is fixed on the flange. In this example, the tip of the screw is formed into an acute angle, and bites into the pipe when the screw is inserted. A technology disclosed in Patent Document 5 is related to pipes used in a vacuum airtight condition, wherein the pipes are pressed each other under atmospheric pressure.

As a method to connect pipes by adhesive or bolts without using flanges, for example, Patent Documents 2 and 3 respectively disclose methods to insert the pipes from both ends of a cylindrical joint and connect them. In these cases, the pipes are to house electric wires, and the bolts are screwed on the periphery wall surfaces of the pipes along the radial direction, and the pipes are deformed by tightening force of the bolts to be fixed. Thus bolted pipes are to protect the inside electric wires, namely unlike a fluid, the wires in themselves have no pressure, and there is no fear of liquid leakage. Patent Document 4 discloses a technology for connecting bars by bolts, wherein the bar sides are deformed by tightening force of the bolts to be fixed like Patent Documents 2 and 3.

Patent document 6 discloses a cylindrical sleeve covering across the pipes. The sleeve is provided with through holes in which bolts are inserted toward the pipes. One of the pipes has a fitting groove for catching the tips of the bolts with no clearance therebetween. It is possible to apply appropriate pressure on a seal by fitting the bolts into the fitting groove in a state that the pipes are pressed each other arranging the seal between their end faces.

Connecting pressure pipes for leading high-pressure fluid needs to secure a sealing performance for inner fluid. A sealing member for closing tight clearance between the pipes can exhibit the sealing performance by being loaded in a compression state. However, the sealing member must be exchanged when it is secularly changed by pressure, temperature and erosion of the inner fluid not to keep the original sealing performance. According to the connecting method using flanges, the sealing member can be easily exchanged by removing the bolts fastening the flanges. The above-mentioned conventional cylindrical joint is not related to the pressure piping. However, if using the cylindrical joint for the pressure piping, the cylindrical joint itself must be removed from the pipes, and therefore, workloads are increased.

RELATED ART DOCUMENTS

Patent Documents

Patent document 1: Japanese Utility Model Registration No. 3152172
Patent document 2: Japanese Examined Utility Model Publication No. 51-9667
Patent document 3: Japanese Unexamined Patent Application Publication No. 2003-180011
Patent document 4: Japanese Unexamined Patent Application Publication No. 2010-180957
Patent document 5: Japanese Unexamined Patent Application Publication No. 63-20946
Patent document 6: Japanese Unexamined Patent Application Publication No. 2011-127672

SUMMARY OF THE INVENTION

Object to be Solved by the Invention

Although the flange type pipe joint has an advantage of easily exchanging the sealing member, it needs welding operation and forming the flange for the pipe. The technology of Patent document 5 relates to a pipe used in a vacuum-airtight state. In applying this technology to high-pressure fluid in which tension is produced to separate the pipes each other, if the tip of the screw slides over the pipe due to the tension a little, compressive force stored in a wire gasket on the end face of the pipe is disappeared and the high-pressure fluid inside the pipe comes to blow out. Although a fixing method in which the pipes are tightened by bolts screwed along the radial direction like Patent Documents 2 and 3 needs no operations such as welding etc., sealing is needed so that the fluid inside the pipe should not leak from the clearance between the cylindrical joint and the pipe to use as a joint for pressure piping.

The applicant has suggested a flange joint for using bolts screwed along the radial direction (hereinafter called a vertical insertion bolt) in International Patent Application No. PCT/JP2011/74116. According to this suggestion, it is possible to provide a joint having a sealing performance and bond strength stronger than that of the pressure piping of JIS (Japanese Industrial Standard) specification.

The present invention aims to provide a bolt type flange joint with good mounting workability in the flange joint connecting structure in which the bolts screwed along the radial direction are used.

Means to Solve the Problem

The present invention is characterized by a flange joint for connecting a face, on the side on which a pressure pipe aligned on the center line is inserted into a center hole, and a face, on the side that another component is connected, by the outer circumferential surface. The flange is provided with horizontal holes and vertical holes. The horizontal holes penetrate parallel to the center hole between the insertion-side face and the connection-side face and are fastened with horizontal bolts. The vertical holes are provided with a screw thread on an inner wall of the flange joint and penetrate from the outer circumferential surface to the center hole so as to intersect the horizontal holes between the insertion-side face and the connection-side face.

Effects of the Invention

According to the flange joint connecting structure of the present invention, it is possible to connect pressure pipes with bolts without welding in a piping work in which tensile strength is required. Further, the flanges can be connected with bolts as in the past.

MODE FOR CARRYING OUT THE INVENTION

Example 1

Figure 1:
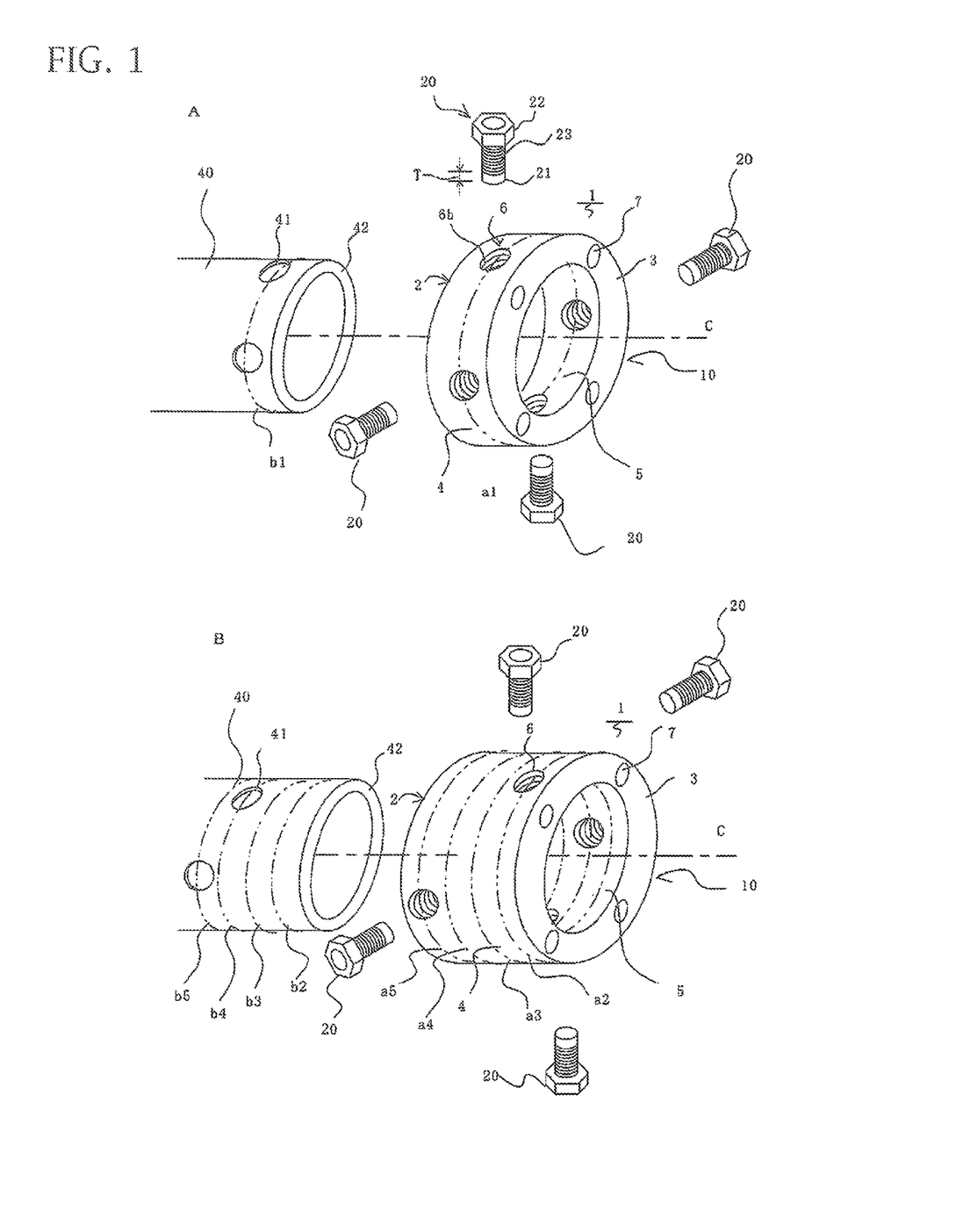
FIG. 1 illustrates a flange joint according to a first embodiment.

FIG. 1 illustrates a flange joint 1 expressed in the first embodiment. A flange as shown in FIG. 1A is different from a flange as shown in FIG. 1B in the points that vertical holes 6 (described later) of the flange joint 1 of FIG. 1A are provided on the same circumference whereas the vertical holes 6 of FIG. 1B are arranged shifting in a direction of centerline C. Besides, in FIG. 1, two-dot chain lines a1, a2, a3, a4 and a5 respectively show center positions of the vertical holes 6, and two-dot chain lines b1, b2, b3, b4 and b5 respectively show center positions of recesses 41 (described later) of a pressure pipe 40.

The flange joint 1 is a so called plate flange, having a disc-like outer shape. The pressure pipe 40 is inserted into the flange joint 1 along the centerline C. In the figure, the left side of the flange joint 1 forms a face 2 on the side in which the pressure pipe 40 made of metal is inserted, and the right side forms a face 3 on the side to which another component (another flange) is connected. Each of the faces 2, 3 has a ring shape and is vertically provided to the centerline C. These faces 2, 3 are connected by a cylindrical outer circumferential surface 4.

Figure 2:
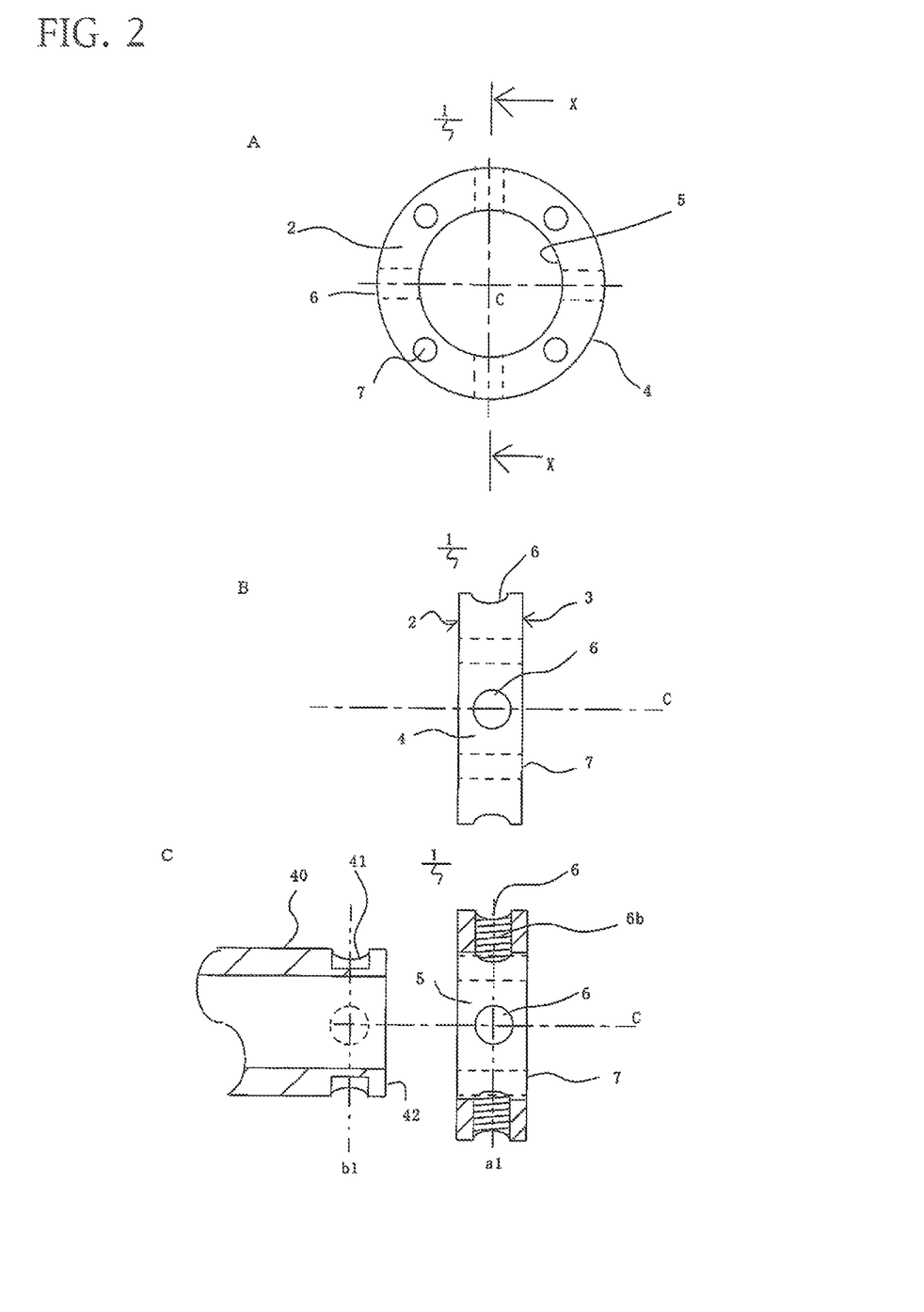
FIG. 2 illustrates a front view, a side view and a sectional view of a flange joint.

FIG. 2 shows a front view (FIG. 2A), a side view (FIG. 2B) and a cross-sectional view taken on line X-X (FIG. 2C) when the insertion-side face 2 in FIG. 1A is viewed from the front. When a sealing member (see FIG. 3) is directly contacted on the connection-side face 3, in the connection-side face 3, the surface roughness is adjusted not to damage the sealing member. However, if the sealing member is not directly contacted thereon, a roughness adjustment is not particularly needed. Besides, for convenience of explanation in the following, the left side face 2 is called the insertion-side face 2 and the right side face 3 is called the connection-side face 3. Here, both faces may have the same shapes or different shapes.

The flange joint 1 has a center hole 10 in which the pressure pipe 40 is inserted. The center hole 10 is a round cavity centering on the centerline C of a flange joint 100. An inner circumferential surface 5 forming the center hole 10 penetrates the faces 2, 3 of both sides of the flange joint 1 with the same inner diameter. The flange joint 1 is provided with through holes 6 penetrating from an outer circumferential surface 4 to the inner circumferential surface 5 toward the center at intervals of equal angle. A screw thread 6b is provided on the wall surface of each of the holes 6. A bolt 20 to be screwed on the screw thread 6b has no screw threads 23 in a range T of the tip of a cylindrical tailpiece 21, as explained later. In the following, each of the holes 6 is called a vertical hole because they are made perpendicular to the centerline C of the flange joint 1. The bolt 20 to be screwed into the vertical hole 6 is called a vertical bolt 20 because it is similarly screwed toward the center.

The flange joint 1 is provided with holes 7 parallel to the center hole 10. These holes 7 have screw threads respectively. Each of the holes 7 is called a horizontal hole 7 in distinction from the vertical hole 6. The horizontal holes 7 are penetrated by bolts 30 (see FIG. 3, hereinafter called horizontal bolts 30) when the flange joints 1 are connected with the bolts 30 and nuts. The horizontal holes 7 penetrate from the insertion-side face 2 to the connection face 3, whereas the vertical holes 6 are provided between the face 2 and the face 3 so as to intersect the horizontal holes 7.

From such a positional relationship between the vertical holes 6 and the horizontal holes 7, when screwing the vertical bolts 20 into the vertical holes 6, the working area is a doughnut-shaped annular space enclosing the outer circumferential surface 4 of the flange joint 1 between the insertion-side face 2 and the connection-side face 3. On the other hand, when screwing the horizontal holes 7 into the horizontal holes 7, the working area is a space of the left from the insertion-side face 2.

The pressure pipe 40 is provided with non-through recesses 41 each having a round-shaped section at the positions directly facing the vertical hole 6 when being inserted into the center hole 10 of the flange joint 1. When the vertical insertion bolts are screwed into the bolt holes of the flange joint 1, each tailpiece having no screw threads is fitted on each of the recesses 41.

Figure 3:
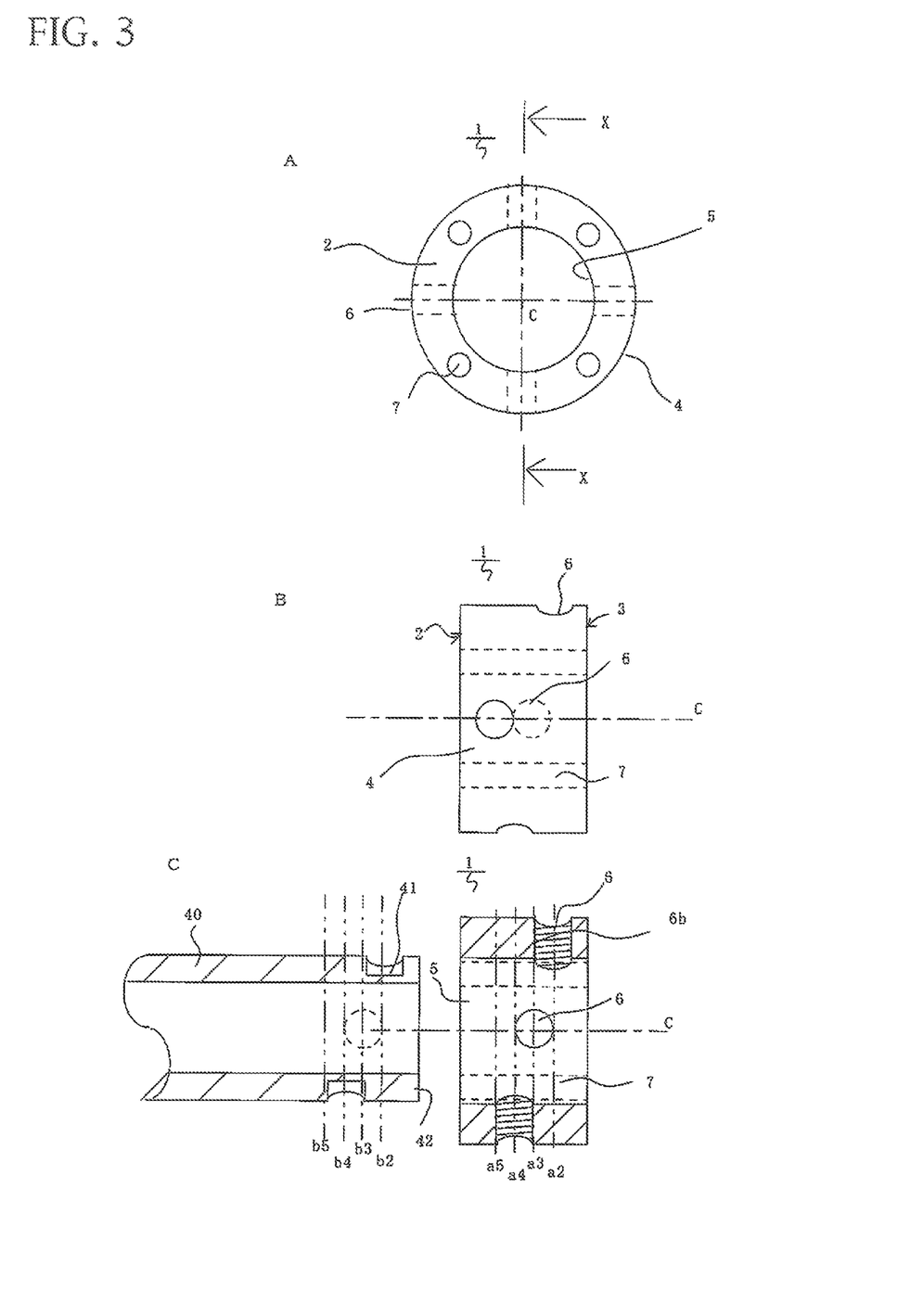
FIG. 3 illustrates a front view, a side view and a sectional view of another flange joint.

FIG. 3 shows a front view (FIG. 3A), a side view (FIG. 3B) and a sectional view taken on a line X-X (FIG. 3C) when the insertion-side face 2 in FIG. 1B is viewed from the front. The vertical holes 6 of the flange joint 1 and the recesses 41 of the pressure pipe are arranged around the centerline C with their positions shifted.

Figure 4:
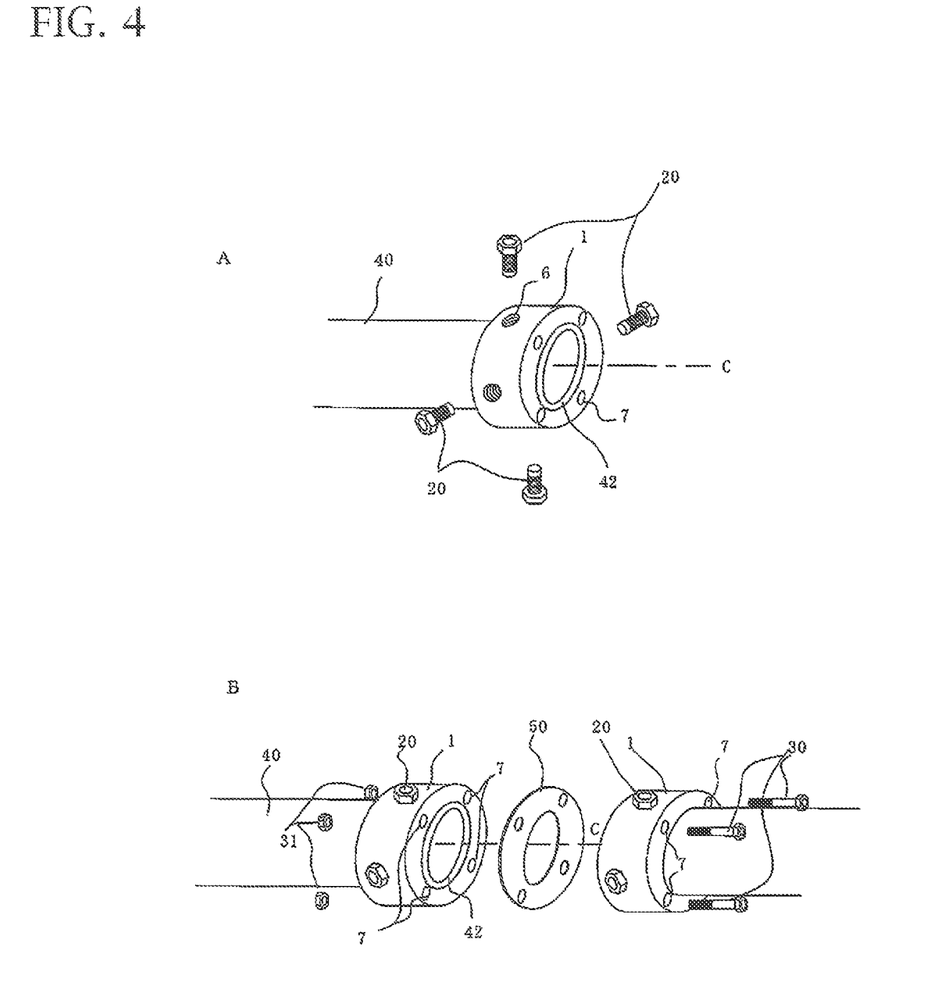
FIG. 4 illustrates installing procedure by a flange joint.

A manner as to connect two pressure pipes 40 by using the flange joint 1 at an installation site will be explained as follows. In FIG. 4, an end face 42 of the length-adjusted pressure pipe 40 is inserted into the center hole 10 from the insertion-side face 2. In this case, it is preferable that the end face 42 be positioned so as to be a single face with the connection-side face 3. Under this condition, the pressure pipe 40 is marked corresponding to the positions of the bolt holes. Then, the pressure pipe 40 is removed from the flange joint 1 to form the recesses 41 on the marked positions. The hollow 41 is formed in a depth not exceeding the thickness of the pressure pipe 40, and a cylindrical shape closely fitting on a range T of the tip of the tailpiece 21 of the vertical bolt 20.

Then, the pressure pipe 40 is inserted into the flange joint 1, and the relative positional relationship to the flange joint 1 is returned to the original marked state. Thereafter, the vertical bolts 20 are screwed and penetrated into the vertical holes 6, and the tailpieces 21 are fitted into the recesses 41 to be fastened.

A sealing member 50 is arranged so as to contact with the end faces 42 of the pressure pipes 40 viewed from the connection-side faces 3 of the flange joints 1 to connect the flange joints 1 with the horizontal bolts 30 and the nuts 31.

Figure 5:
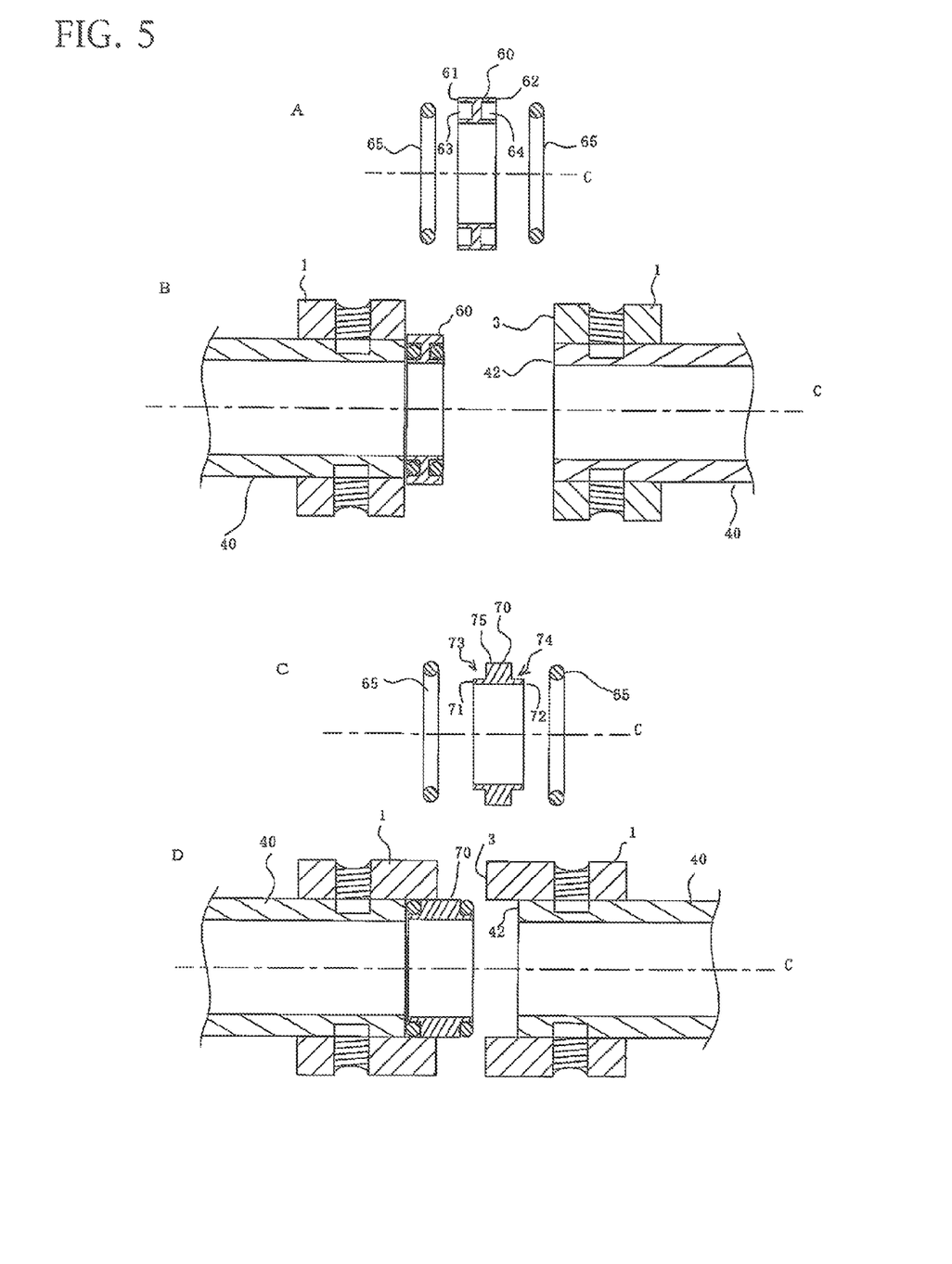
FIG. 5 illustrates an example of an insert.

The sealing member 50 is applied with prestress by adjusting fastening pressure of the horizontal bolts 30 and the nuts 31. The position of the end face 42 of the pressure pipe 40 is sealed because it is the only position to block the air from the inside of the pressure pipe. Accordingly, the sealing member 50 seals the end face 42 having only the thickness of the pressure pipe 40. Various sealing members are available as this sealing member according to the fluid (liquid, air, low pressure, high pressure) flowing the pressure pipe 40. For example, in using a gasket or a packing, it should have a size protruding from the end face 42 of the pressure pipe 40 to the end face of the flange joint. On the other hand, in using an O-ring, an insert wherein the O-ring is made to stay on the end face 42 of the pressure pipe 40 can be used. FIG. 5 shows an example of the insert.

An insert 60 as shown in FIG. 5A has a ring shape, being provided with annular faces 61, 62 orthogonal to the centerline C. The annular faces 61, 62 are respectively provided with ring grooves 63, 64. O-rings 65 are interfitted into the ring grooves 63, 64, respectively. The ring grooves 63, 64 have such a depth that the O-rings 65 should not protrude from the ring grooves 63, 64 when the horizontal bolts and the nuts apply an appropriate compressive force. In using the insert 60, as shown in FIG. 5B, the end face 42 of the pressure pipe 40 and the connection-side face 3 of the flange joint 1 are formed in the same plane.

According to this, the O-rings 65 are compressed with the appropriate compressive force when the annular faces 61, 62 are respectively contacted to the end faces 42 of the pressure pipes 40.

An insert 70 as shown in FIG. 5C is provided with stepwise grooves 73, 74 instead of the ring grooves 63, 64 unlike the insert 60. Each of the stepwise grooves 73, 74 does not have one side of a wall. An outer diameter of the insert 70 is equal to an inner diameter of the sealed face-side of the center hole 10 of the flange joint 1. As shown in FIG. 5D, when the end face 42 of the pressure pipe 40 is arranged to the inside from the connection-side face 3 of the flange joint 1, an outer circumferential surface 75 of the insert 70 is formed to be just interfitted into the center hole 10.

Figure 6:
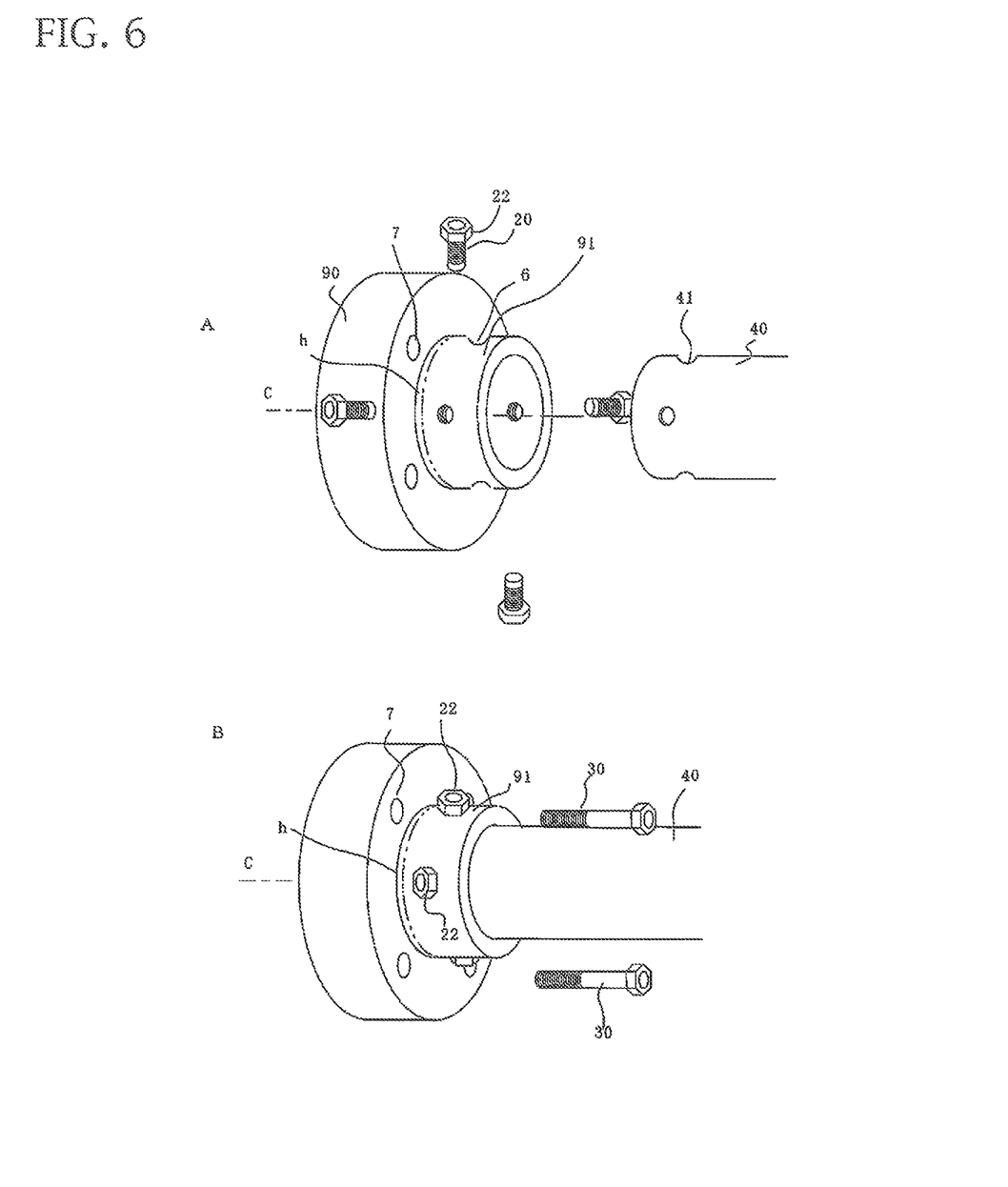
FIG. 6 illustrates a comparative example.

In FIG. 6, a flange joint 90 is provided with an extension part 91 having the vertical holes 6. In a conventional hub flange, the extension part 91 is formed by extending a hub h which protrudes from the insertion-face-side to be welded to the pressure pipe. In thus formed flange joint 90, in inserting and fastening the horizontal bolts 30 into the horizontal holes 7 as shown in FIG. 6B after fixing the pressure pipe 40 on the extension part 91 with the vertical bolts 20 as shown in FIG. 6A, the heads 22 of the vertical bolts 20 interfere the working area for fastening the horizontal bolts. Besides, the working area is crowded with the heads of the vertical bolts 20 and the heads of the horizontal bolts 30.

To the contrary, according to the flange joint 1, at the installation site, since the heads 22 of the vertical bolts 20 are located in a space surrounding in a doughnut shape the outer circumferential face 4 between the insertion-side face 2 and the connection-side face 3, they do not stand in the way when the horizontal bolts 30 are fastened, thereby enabling the same work as the conventional welding flange joint. Besides, in the above-mentioned example, the bolt 20 can be provided with a screw thread to the tip including an area T of the tailpiece 21. In this case, when the bolt 20 is engaged into the hollow 41, the ridge part of the screw thread of the bolt 20 is in contact with the hollow 41.

Example 2

Figure 7:
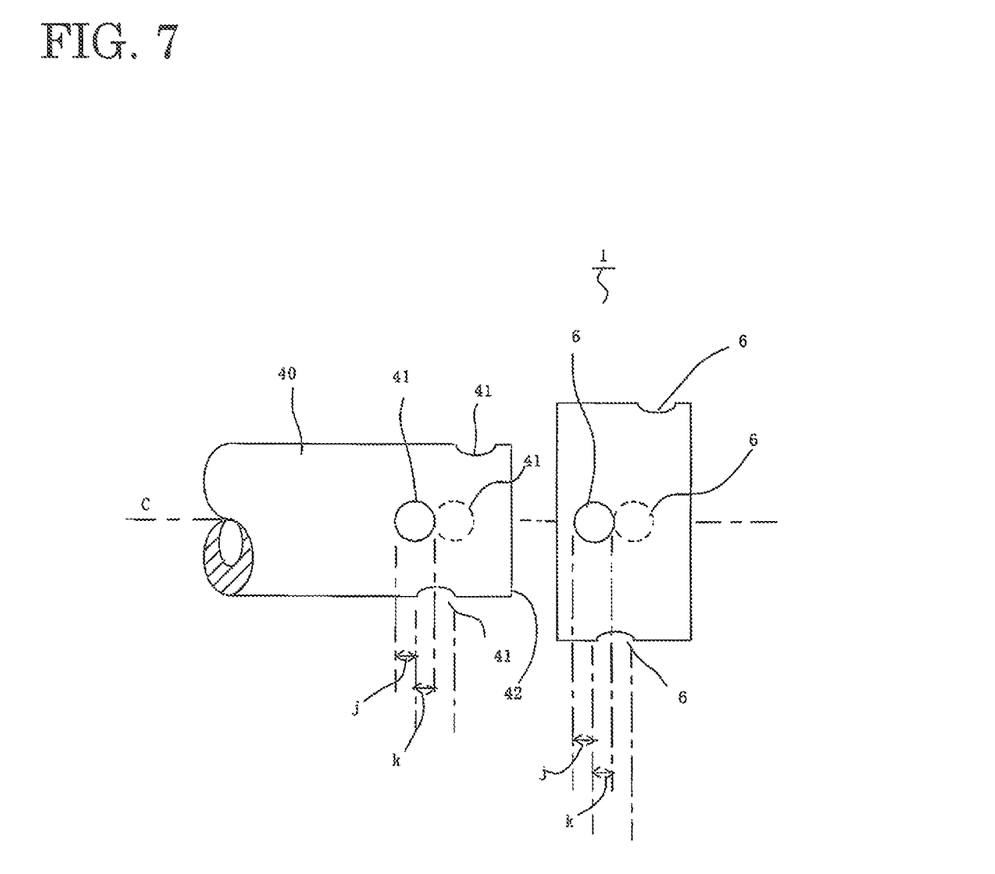
FIG. 7 illustrates a flange joint of another embodiment.

The vertical holes 6 of FIG. 1A are arranged on the same circumference of the flange joint 1, and the vertical holes 6 of FIG. 1B are arranged shifting the positions in the centerline C direction of the flange joint 1. A flange joint 100 of FIG. 7 has the vertical holes 6 arranged shifting the positions in the centerline C direction like the flange joint 1 of FIG. 1B. However, the vertical holes 6 of the flange joint 100 are shifted so as to be spiral clockwise around the centerline C from the insertion-side face 2 to the connection-side face 3.

In fronting the insertion-side face 2, the vertical holes arranged on the right side face, the plane face, the left side face and the bottom face are gradually shifted toward the connection-side face 3. Thus shift amount is illustrated with being signed "j" in FIG. 7. Besides, openings of the vertical holes 6 are overlapped one another on the same circumference. Thus overlapping is illustrated with being signed "k" in FIG. 7. On the other hand, the vertical holes 6 can be shifted in order of the right side face, the left side face, the bottom face and the plane face without the well-sequenced spiral arrangement. The shifting manner is optional. The pressure pipe 40 is provided with the recesses 41 so as to shift them one another corresponding to the shifted vertical holes 6 of the flange joint 100.

According to the flange joint 1 of EXAMPLE 1, the pressure pipe 40 has the thickness reduced due to the recesses 41, therefore decreasing in the strength. The flange joint 1 can be strengthened by setting up the thickness separate from the diameter of the pressure pipe 40. However, the thickness of the pressure pipe 40 cannot be changed. On the other hand, the recesses 41 provided to the pressure pipe are shifted to be positioned in the lengthwise direction by shifting the positions of the vertical holes 6 like the flange joint 100. According to this, the reduction of the thickness of the pressure pipe on the same circumference (for example, on double chain line b1) due to the recesses 41 can be dispersed. Therefore, tensile strength can be enhanced. When completely eliminating the overlapping k of the recesses 41, a continuous part appears on one round of the same circumference of the pressure pipe, thereby being enabled to be further strengthened. In making the shift amount j larger than a diameter of the vertical hole 6 or hollow 41, the overlapping k is completely set to zero.

Example 3

Figure 8:
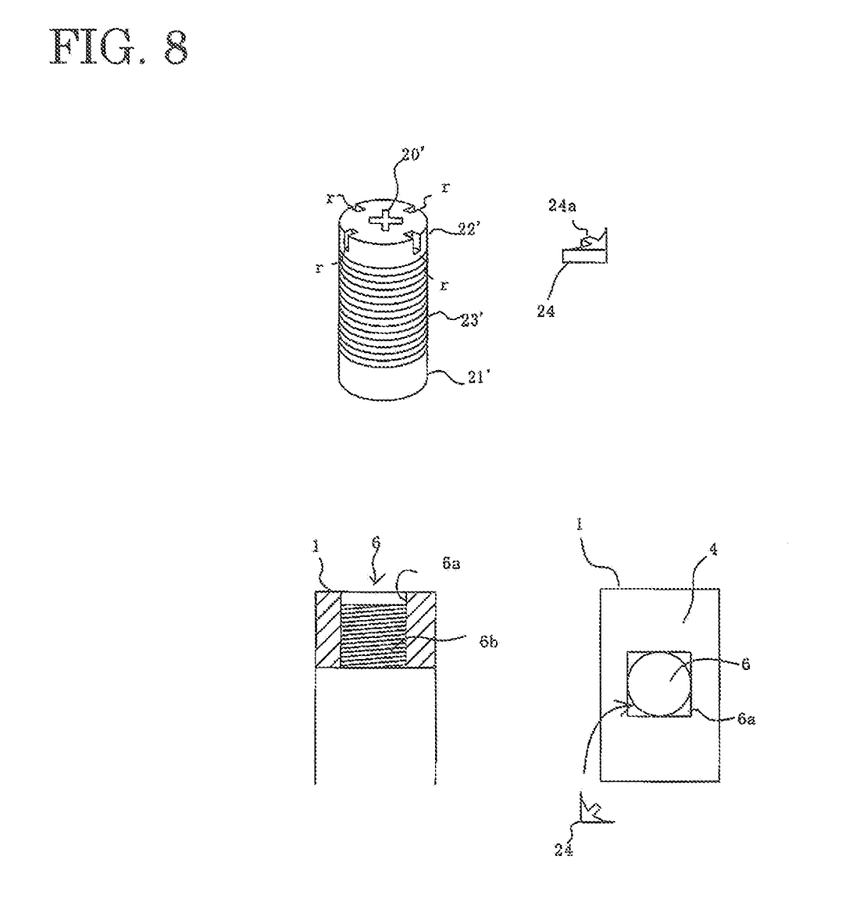
FIG. 8 illustrates a flange joint of another embodiment.

The head of the vertical bolt 20 can be embedded in the outer circumferential surface of the flange joint. For example, a vertical bolt 20' shown in FIG. 8 is a cross-recessed head screw including a head 22', a tailpiece 21' and a shank 23' each having the same diameter. The head 22' has four notches in diagonal lines. A square recess 6a is formed at the mouth of the vertical hole 6 of the flange joint 100. FIG. 8B shows a turn stopper 24. The turn stopper 24 has a planar shape corresponding to a space between the recess 6a and the head 22' when inserting the vertical bolt 20' into the vertical hole 6. A convex part 24a of the turn stopper 24 is inserted into a notch r of the head 22'. The vertical bolt 20' is prevented from rotating by fitting turn stoppers 24 to four gaps between the recess 6a and the head 22'. Accordingly, the head of the vertical bolt 20' is protected without protruding from the outer circumferential surface 4 of the flange joint 100, besides providing a good appearance after installation.

Example 4

Figure 9:
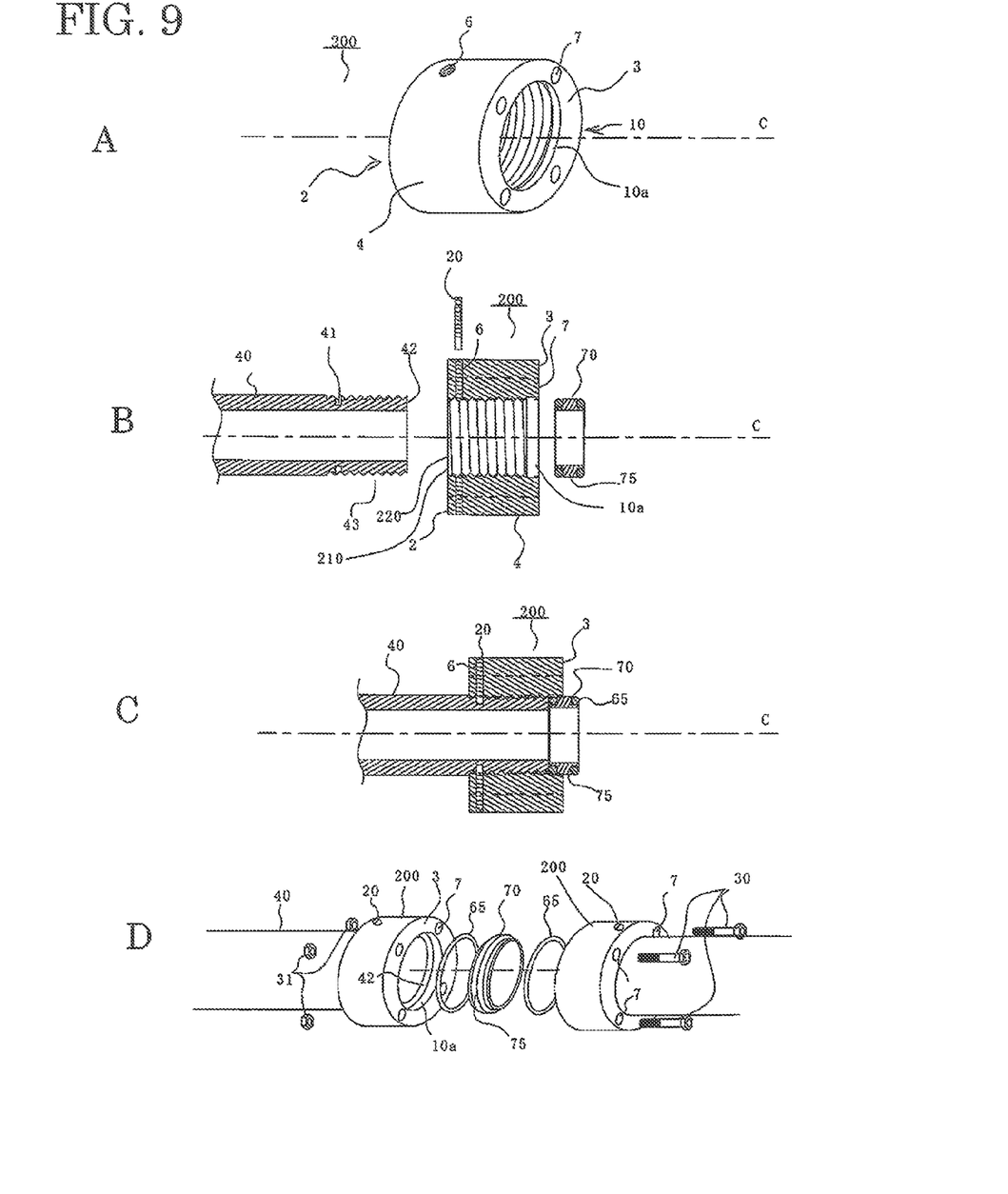
FIG. 9 illustrates a flange joint of another embodiment.

FIG. 9 shows a flange joint 200 for connecting the pressure pipe being screwed in the center hole. The flange joint 200 is a type of screwed-type flange (Threaded Flange). A center hole 210 is provided with a screw thread 220 drawing a spiral around the centerline C. The screw thread 220 forms a parallel thread not a taper thread. On the other hand, the flange joint 200 is provided with a screw thread (eternal thread) 43 screwed with a screw thread (internal thread) of the center hole 210.

Further, the vertical holes 6 are provided to prevent the pressure pipe 40 from being loosened due to longtime use, and the vertical bolts 20 are inserted the vertical holes 6 to fit with the hollow 41 of the pressure pipe 40 (FIG. 9B). The flange joint 200 is connected with the bolts 30 and the nuts 31 through the horizontal holes 7 as same as the former example (for example, FIG. 9D). In this example, in using an insert 70, an outer circumferential surface 75 of the insert 70 is fitted with a mouth 10a of the center hole 10 by the connection-side face 3 of the flange joint 200. The part of the center hole 210 which the outer circumferential surface 75 is inserted into is formed in a flat curved face around the centerline C without a screw thread. In using a sealing member 50 or an insert 60, the mouth 10a of the center hole 10 by the connection-side face 3 of the flange joint 200 is provided with a screw thread, and the pressure pipe 40 can be screwed so that the end face 42 is flush to the connection-side face 3.

Although the invention has been described in each example, the flange joint is not necessarily a disk. For example, it may be rectangular or other polygonal. The insertion-side face may be provided with a hub present in a hub flange of a welding-type plug flange. Besides, the circumferential surface may be a smooth curved surface or a corrugated surface. For example, in case of the flange shape shown in FIG. 4 of Patent Document 1, the vertical holes are provided to recessed portions at the centerline side between the horizontal holes of the flange joint.

EXPLANATION OF REFERENCED NUMERALS

1, 100, 200 flange joint
2 insertion-side face
3 connection-side face
4 outer circumferential surface
5 inner circumferential surface
6 vertical hole
7 horizontal hole
20 vertical bolt
30 horizontal bolt

The invention claimed is:

1. A flange joint connection structure, comprising:
   a flange joint;
   a pressure pipe,
   said flange joint comprising:
   a center hole, for inserting said pressure pipe into;
   an insertion-side face, said face being on a side on which the pressure pipe aligned on a centerline is inserted into the center hole;
   a connection-side face, said face being on a side to which another component is connected;
   an outer circumferential surface; said surface connecting the insertion-side face and the connection-side face;
   horizontal holes penetrating parallel to the center hole between the insertion-side face and the connection-side face, in which horizontal bolts are fastened;
   vertical holes each comprising an inner wall being provided with a screw thread, said vertical holes penetrating from the outer circumferential surface to the inner hole between the insertion-side face and the connection-side face between the horizontal holes, wherein the vertical holes being shifted so as to spiral entirely around the centerline from the insertion-side face to the connection-side face so that the vertical holes overlap one another on the outer circumferential surface;
   said pressure pipe comprising:
   an outer circumferential surface inserted into the center hole of the flange joint;
   recesses arranged to positions corresponding to the spirally shifted vertical holes, the recesses and the vertical holes being respectively arranged on the flange joint and the pressure pipe at intervals of equal angle shifting positions on the centerline between the insertion-side face and the connection-side face;
   wherein bolts screwed into the vertical holes of the flange joint from the outer circumferential surface penetrate and are interfitted to the recesses.

2. The flange joint connection structure according to claim 1, wherein the center hole of the flange joint is provided with a spiral screw thread around the centerline.

3. The flange joint connection structure according to claim 2, wherein a mouth of the center hole on the connection-side face of the flange joint forms a flat curved face around the centerline.

* * * * *